United States Patent [19]

Takekoshi et al.

[11] Patent Number: 4,634,760

[45] Date of Patent: Jan. 6, 1987

[54] NOVEL COPOLYIMIDES AND POLYAMIC ACID PRECURSORS THEREFOR

[75] Inventors: Tohru Takekoshi, Scotia; Donald C. Clagett, Rensselaer, both of N.Y.; Stephen M. Cooper, Evansville, Ind.

[73] Assignee: General Electric Company, Schenectady, N.Y.

[21] Appl. No.: 798,090

[22] Filed: Nov. 14, 1985

[51] Int. Cl.$^4$ .................................... C08G 69/26
[52] U.S. Cl. ........................... 528/353; 528/26; 528/31; 528/172; 528/173; 528/183; 528/184
[58] Field of Search ............ 528/26, 31, 172, 173, 528/183, 184, 353

[56] References Cited

U.S. PATENT DOCUMENTS

| | | | |
|---|---|---|---|
| 3,983,093 | 9/1976 | Williams, III et al. | 260/47 CP |
| 4,247,443 | 1/1981 | Sasaki et al. | 260/33.4 P |
| 4,290,436 | 9/1981 | Sasaki et al. | 260/33.4 P |
| 4,438,256 | 3/1984 | Ohta et al. | 528/353 X |
| 4,489,185 | 12/1984 | Schoenberg | 528/353 X |

*Primary Examiner*—Lucille M. Phynes
*Attorney, Agent, or Firm*—William H. Pittman; James C. Davis, Jr.; James Magee, Jr.

[57] ABSTRACT

Copolyimides having good solvent resistance, thermal stability and processability contain about 2–50 mole percent of structural units derived from a tetracarboxybiphenyl, in combination with other structural units typically derived from bisphenol A dianhydride.

13 Claims, No Drawings

NOVEL COPOLYIMIDES AND POLYAMIC ACID PRECURSORS THEREFOR

This invention relates to novel copolyimides and polyamic acid precursors therefor, and more particularly to copolyimides having good solvent resistance, thermal stability and processability.

Various species of polyimides are known to have one or more beneficial properties, but such properties are generally accompanied by less desirable ones. For example, polyimides derived from pyromellitic dianhydride have good solvent resistance and thermal stability but are difficult to process. On the other hand, polyetherimides such as those prepared by the reaction of diamines with 2,2-bis[4-(3,4-dicarboxyphenoxy)-phenyl]propane dianhydride (hereinafter "bisphenol A dianhydride") undergo processing with facility; however, it is of interest to improve their solvent resistance and thermal stability.

One method of combining many of these beneficial properties is disclosed in U.S. Pat. No. 3,983,093, which describes copolyimides containing structural units derived from bisphenol A dianhydride and from either pyromellitic dianhydride, benzophenone dianhydride or bis(dicarboxyphenyl)sulfide dianhydride. However, the amount of pyromellitic dianhydride or similar compound required to provide the desired degree of solvent resistance and thermal stability in these copolyimides is quite high.

Another class of highly solvent resistant polyimides, disclosed in U.S. Pat. Nos. 4,247,443 and 4,290,936, contains structural units derived from a biphenyltetracarboxylic dianhydride. Units derived from other dianhydrides may also be present but in amounts not greater than 20 mole percent and preferably below 10 mole percent, since higher proportions inhibit the production of high molecular weight polymer and are detrimental to mechanical strength and thermal stability.

A principal object of the present invention, therefore, is to provide polyimides having a combination of beneficial properties.

A further object is to provide polyimides having said beneficial properties and comprising a substantial proportion of polyetherimide structural units.

Other objects will in part be obvious and will in part appear hereinafter.

In its broadest sense, the present invention includes polymers which may be polyimides or their polyamic acid precursors. Said polymers comprise structural units having the formulas

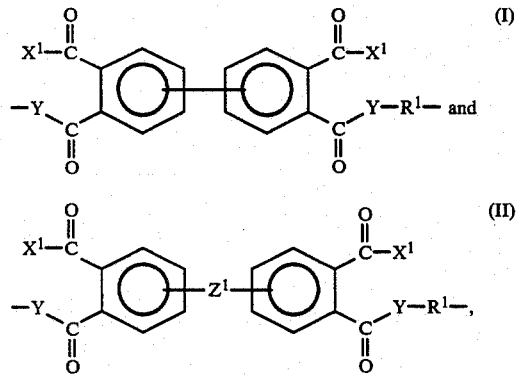

wherein:

$X^1$ is OH and Y is NH, or $X^1$ and Y taken together are N;

$R^1$ is an aromatic hydrocarbon radical containing about 6–20 carbon atoms or a halogenated derivative thereof, an alkylene or cycloalkylene radical containing about 2–20 carbon atoms, or a bis-alkylene poly(dialkylsiloxane) radical;

$Z^1$ is $-R^2-$, $-O-$, $-CO-$, $-S_x-$, $-SO_2-$, $-O-Q-O-$, $-S-Q-S-$ or $-SO_2-Q-SO_2-$;

$R^2$ is a divalent aliphatic or alicyclic radical containing about 1–12 carbon atoms;

Q is a divalent aliphatic or aromatic radical; and x is 1 or 2;

said polymer containing about 2–50 mole percent of structural units having formula I.

As will be apparent from formulas I and II, the polymers of the present invention may contain polyimide units (wherein X and Y taken together are N), polyamic acid units (wherein $X_1$ is OH and Y is NH), or a mixture thereof. In general, the polyamic acids are useful as intermediates for the polyimides when the latter are prepared by the reaction of a dianhydride with a diamine as described hereinafter. The polyimides may also be prepared by the reaction of diamines with bisimides having electron-deficient N-substituents; this method will also be described in more detail. Because the polyimide precursors are most often dianhydrides, frequent reference to dianhydrides will be made hereinafter; however, it should be understood that appropriate bisimides may be substituted for the dianhydrides and that polyimides so prepared are also within the scope of the invention.

The structural units of formula I are derived from various tetracarboxybiphenyls, including the 2,2',3,3'-tetracarboxy, 2,3,3',4'-tetracarboxy and 3,3', 4,4'-tetracarboxy compounds and mixtures thereof. The latter compound and its functional derivatives are preferred because of their availability and particular suitability for preparing polyimides with high solvent resistance, thermal stability and processability.

The structural units of formula II are derived from one or more tetracarboxylic acids characterized by the presence of a $Z^1$ linking moiety between the phthalic acid rings. The $Z^1$ moiety may be a divalent aliphatic or alicyclic radical containing about 1–12 and preferably about 1–6 carbon atoms, illustrated by methylene, ethylene, propylene, trimethylene, ethylidene, cyclopentylidene and cyclohexylidene. Other suitable $Z^1$ values are oxygen atoms, carbonyl groups, monosulfide and disulfide groups and sulfone groups.

Preferably, the $Z^1$ value is $-O-Q-O-$, $-S-Q-S-$ or $-SO_2-Q-SO_2-$, wherein Q is a divalent aliphatic or aromatic radical. The aliphatic Q values generally contain about 1–6 carbon atoms and may be as defined hereinabove with reference to $R^2$.

More preferably, however, the Q values are aromatic radicals, which may be attached through oxygen to the aromatic rings in the 3- or 4-positions, preferably the 4-positions, with respect to the carbonyl groups. Illustrative Q radicals of this type are derived from such compounds as resorcinol, hydroquinone, 4,4'-dihydroxybiphenyl, 4,4'-dihydroxy-3,3',5,5'-tetramethylbiphenyl, 4,4'-dihydroxydiphenylmethane, 3,4'-dihydroxydiphenylmethane, 2,2-bis(2-hydroxyphenyl)propane, 2,2-bis(4-hydroxyphenyl)propane ("bisphenol A"), 2-(3-hydroxyphenyl)-2-(4-hydroxyphenyl)propane, 1,1- bis(4-hydroxyphenyl)ethane, 2,2-bis(4-hydroxyphenyl)pentane, 4,4′-dihydroxybenzophenone, bis(4-hydroxyphenyl)ether, bis(4-hydroxyphenyl)sulfide, bis(4-hydroxyphenyl)sulfoxide, bis(4-hydroxyphenyl)sulfone and 3-hydroxyphenyl 4-hydroxyphenyl sulfone.

The most preferred Q values are those having the formulas

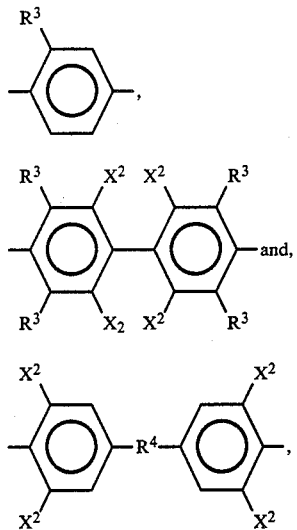

wherein each $R^3$ is independently hydrogen, methyl or halogen, $R^4$ is a straight chain or branched alkylene radical containing 1–5 carbon atoms and is most often the isopropylidene radical, and each $X^2$ is independently hydrogen or halogen (any halogens usually being chlorine or bromine). Especially desirable is the radical derived from bisphenol A by the removal of both hydroxy groups therefrom, and having formula V wherein $R^4$ is isopropylidene and each $X^2$ is hydrogen. Thus, the preferred copolyimides are derived from bisphenol A dianhydride (or the corresponding tetracarboxylic acid), its 2,3-dicarboxyphenoxy and mixed 2,3- and 3,4-dicarboxyphenoxy isomers, and mixtures thereof, with bisphenol A dianhydride being preferred.

The $R^1$ value is as previously defined and may be considered as being derived from a diamine of the formula $$H_2N-R^1-NH_2 \qquad (VI)$$

Examples of suitable $R^1$ values are those in such diamines as ethylenediamine, propylenediamine, trimethylenediamine, diethylenetriamine, triethylenetetramine, heptamethylenediamine, octamethylenediamine, 2,11-dodecanediamine, 1,12-octadecanediamine, 3-methylheptamethylenediamine, 4,4-dimethylheptamethylenediamine, 4-methylnonamethylenediamine, 2,5-dimethylhexamethylenediamine, 2,2-dimethylpropylenediamine, N-methyl-bis(3-aminopropyl)amine, 3-methoxyhexamethylenediamine, 1,2-bis(3-aminopropoxy)ethane, bis(3-aminopropyl)sulfide, 1,4-cyclohexanediamine, bis-(4-aminocyclohexyl)methane, m-phenylenediamine, p-phenylenediamine, 2,4-diaminotoluene, 2,6-diaminotoluene, m-xylylenediamine, p-xylylenediamine, benzidine, 3,3′-dimethylbenzidine, 3,3′-dimethoxybenzidine, 1,5-diaminonaphthalene, bis(4-aminephenyl)methane, bis(4-aminophenyl)propane, 2,4-bis(β-amino-t-butyl)toluene, bis(p-β-methylo-aminopentyl)benzene, 1,3-diamino-4-isopropylbenzene, bis(4-aminophenyl)sulfone, bis(4-aminophenyl)ether and 1,3-bis(3-aminopropyl)tetramethyldisiloxane. Mixtures of these $R^1$ values may also be present. Preferably, $R^1$ is an aromatic hydrocarbon radical; the m-phenylene and bis(4-phenylene)methane radicals are particularly preferred.

The copolyimides of this invention contain about 2–50 mole percent of structural units of formula I, with the balance being other structural units including those of formula II. In the preferred copolyimides, these structural units are the only ones present. Most often, the units of formula I comprise about 5–25 mole percent of the polymer.

Methods for the preparation of copolyimides and polyamic acids by the reaction of tetracarboxylic acids or their esters or dianhydrides with diamines or diisocyanates are known in the art. A somewhat different method, comprising the reaction of a diamine with a tetracarboxylic acid bisimide of an amine containing an electron-deficient radical, is disclosed in copending, commonly owned application Ser. No. 505,636, filed June 20, 1983, now U.S. Pat. No. 4,578,470 issued Mar. 25, 1986 the disclosure of which is incorporated by reference herein.

The electron-deficient radical is generally derived from an amine $Z^2$—$NH_2$ which comprises at least 10 mole percent, most often at least about 30 mole percent and preferably at least about 50 mole percent, of the free amine constituents of an equilibrated mixture from the reaction represented by the equation

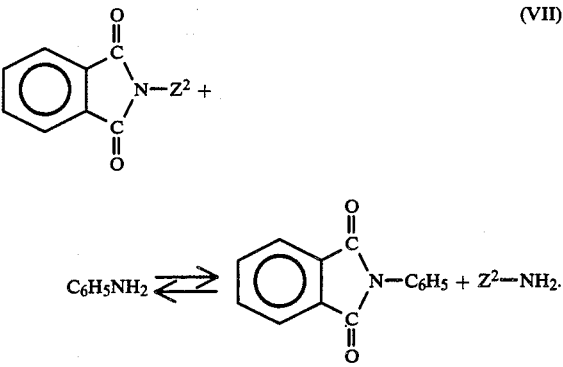

It is preferred that the amine $Z^2$—$NH_2$ have a boiling point at atmospheric pressure less than about 300° C., usually less than 250° C., more preferably less than about 210° C. and most desirably less than 180° C. A maximum boiling point of about 300° C. is mandatory, and the above-noted lower boiling points still more preferred, when said amine comprises less than about 75 mole percent of the free amine constituents of the equilibrated mixture. The lower boiling points are preferred in order that the equilibrium may be easily shifted in favor of polyimide formation during reaction with a diamine.

Methods for bringing the reaction represented by equation VII to equilibrium and analyzing the equilibrated mixture will be apparent to those skilled in the art. In a typical method, a mixture of 0.005 mole each of aniline and the N-(Z-substituted)phthalimide is placed in a 10-ml. stainless steel reactor which is then purged with nitrogen, sealed and heated at 250° C. for one hour in a constant temperature bath. The tube is then removed, cooled and opened and the reaction mixture is sampled and analyzed by high pressure liquid-liquid chromatography.

The principal chemical characteristic of the $Z^2$ value is its high degree of electron deficiency. For the most part, suitable electron-deficient groups comprise aromatic hydrocarbon radicals containing one or more strongly electron-withdrawing substituents and heterocyclic radicals having aromatic character.

Suitable aromatic hydrocarbon radicals include phenyl, naphthyl and the like containing such substituents as halo, nitro, keto, carbalkoxy, cyano and perfluoroalkyl. At least one of said electron-withdrawing substituents is preferably ortho or para to the free valence bond (i.e., the one attached to the amino group in $Z^2$—$NH_2$). The trifluoromethylphenyl radicals are particularly preferred.

Suitable heterocyclic radicals having aromatic character include those with 5- or 6-membered rings and aromatic unsaturation of the type existing in pyrrole and pyridine. These radicals preferably contain 1–3 and especially 1 or 2 hetero atoms of which at least one is nitrogen and the others, if present, are nitrogen or sulfur. They are usually unsubstituted but may be substituted, especially with electron-withdrawing substituents such as those previously enumerated. The free valence bond is preferably in the 2- or 4-position with respect to a hetero atom. If the ring contains more than one hetero atom and especially if it is 5-membered, the free valence bond is preferably attached to the single carbon atom between two of said hetero atoms.

Illustrative 5-membered heterocyclic radicals are pyrrolyl, 2-thiazolyl, 2-imidazolyl and 2-(1,3,4-thiadiazolyl). Illustrative 6-membered radicals are 2-pyridyl, 3-pyridyl, 4-pyridyl, 2-pyrimidyl, 2-pyrazyl, 2-(1,4thiazolyl) and 2-(1,3-thiazolyl). Particularly preferred Z values are the aminopyridyl radicals, especially 2-pyridyl and 4-pyridyl.

When a dianhydride is used as the reactant, an initial reaction to form a polymer containing predominantly amic acid groups may occur at temperatures as low as about 25° C. In general, the temperatures no higher than about 100° C. are required for polyamic acid formation. Substantially complete conversion to a polyimide generally takes place at temperatures up to about 250° C., most often about 125°–200° C. As pointed out hereinafter, it may under certain circumstances be desirable to obtain and isolate the polyamic acid as an intermediate in polyimide formation. If so, the reaction temperature should be regulated accordingly. If polyamic acid formation is not desired, the reaction mixture may simply be heated at a temperature within the range of about 150°–400° C., preferably about 250°–350° C., until the reaction is complete.

Polymerization may be effected in solution in a suitable solvent, typically an aromatic hydrocarbon such as toluene or xylene, a hydroxylated or chlorinated aromatic hydrocarbon such as phenol, m-cresol, chlorobenzene or o-dichlorobenzene, or a polar aprotic solvent such as dimethylformamide, dimethylacetamide, dimethyl sulfoxide or N-methylpyrrolidone. Mixtures of these solvents may also be used. For polyimide formation, the use of a mixture containing at least one solvent which forms an azeotrope with water (e.g., toluene), usually in an amount up to about 20% by weight, may be advantageous. The reaction may also be effected in bulk, typically by the use of extrusion and/or wiped film techniques or the like. Copolyimides containing more than about 40 mole percent of units of formula I are generally most conveniently prepared in bulk.

The mole ratio of diamine to dianhydride or bisimide is generally between about 0.9:1 and about 1.2:1. In general, polymers of higher molecular weight are obtained by employing ratios equal to or very close to 1:1. For the purposes of this invention, the equivalent weight of a diamine, dianhydride or bisimide is half its molecular weight.

It is within the scope of the invention to include in the reaction mixture chain stopping agents, typically monofunctional aromatic amines such as aniline or monoanhydrides such as phthalic anhydride. They are usually present in the amount of about 1–5 mole percent of total anhydride or amine constituents, as appropriate. Metal carboxylates or oxygenated phosphorus compounds may also be present as catalysts in accordance with U.S. Pat. Nos. 4,293,683 and 4,324,882, the disclosure of which is incorporated by reference herein.

The weight average molecular weights of the polymers of this invention are generally within the range of about 5,000–100,000 and most often about 10,000–50,000. Their intrinsic viscosities, measured in a 60:40 mixture of phenol and 1,1,2,2-tetrachloroethane at 25° C., are usually at least about 0.3 and preferably in the range of about 0.4–0.8.

The invention is illustrated by the following examples. All parts are by weight.

EXAMPLE 1

A mixture of 223.4 parts (2.07 moles) of m-phenylenediamine, 936.9 parts (1.80 moles) of bisphenol A dianhydride, 19.6 parts (0.13 mole) of phthalic anhydride, 0.2 part of an oxygenated phosphorus catalyst (as disclosed in U.S. Pat. No. 4,324,882) and 1960 parts of o-dichlorobenzene was stirred in a nitrogen atmosphere in a helicone reactor, heated to 125° C. and maintained at that temperature for ½ hour. Then 58.8 parts (0.2 mole) of 3,3',4,4'-tetracarboxybiphenyl dianhydride was added and the mixture was heated at 165° C. for 2 hours as water of reaction was removed, after which the temperature was gradually raised to 275° C. and the o-dichlorobenzene was removed by distillation. Vacuum was applied slowly over one hour and the temperature raised to 295° C. to complete imidization, after which the product was extruded into cold water. The desired copolyimide containing 10 mole percent of units of formula I was obtained.

EXAMPLE 2

The procedure was similar to that of Example 1, except that 832.8 parts (1.6 moles) of bisphenol A dianhydride and 117.6 parts (0.4 mole) of the tetracarboxybiphenyl dianhydride were employed and the mixture was heated under vacuum to 309° C. The desired copolyimide containing 20 mole percent of units of formula I was obtained.

EXAMPLE 3

The procedure was similar to that of Example 1, except that 728.8 parts (1.4 moles) of bisphenol A dianhydride and 176.4 parts (0.6 mole) of the tetracarboxybiphenyl dianhydride were employed and the mixture was heated under vacuum to 320° C. The desired copolyimide containing 30% of units of formula I was obtained.

EXAMPLE 4

The procedure was similar to that of Example 1, except that 624.6 parts (1.2 moles) of bisphenol A dianhydride and 235.2 parts (0.8 mole) of the tetracarboxybiphenyl dianhydride were employed and the mixture was heated under vacuum to 369° C. The desired copolymer containing 40 mole percent of units of formula I was obtained.

EXAMPLES 5-7

Copolyimides containing 30, 40 and 50 mole percent of units of formula I were prepared from 50 mmol. of m-phenylenediamine and 48.5 mmol. of total dianhydrides by the following procedure: A mixture of the diamine, bisphenol A dianhydride, 51.7 parts of m-cresol and 17.32 parts of toluene was heated under nitrogen for 1 hour at 145° C. as water as removed by azeotropic distillation. The solution was cooled and the tetracarboxybiphenyl dianhydride and 3 mmol. of phthalic anhydride were added. The mixture was reheated and water again removed by azeotropic distillation until the pot temperature reached 160° C. It was then heated under reflux at 160°-170° C. for 6 hours and the desired copolyimides were recovered by precipitation into methanol.

The properties of the copolyimidies of this invention, molded into test specimens as necessary, are given in the following table. Controls A and B are respectively a homopolyimide prepared from m-phenylenediamine and bisphenol A dianhydride, and a copolyimide containing 80 mole percent bisphenol A dianhydride-derived units and 20 mole percent pyromellitic dianhydride-derived units.

|  |  |  |  |  | Controls | |
|---|---|---|---|---|---|---|
| Formula 1 units, mole % | 10 | 20 | 30 | 40 | A | B |
| Intrinsic viscosity, dl./g. | 0.70 | 0.66 | 0.72 | 0.89 | 0.62 | 0.67 |
| Tg, °C. | 227 | 234 | 238 | 246 | 217 | 235 |
| Heat distortion temp. under load of 264 psi. (18.56 kg./sq. cm.), °C. | 211 | 215 | 220 | 226 | 198 | 210 |
| Flexural strength: |  |  |  |  |  |  |
| Psi. | 22,745 | 22,700 | 22,300 | 22,800 | 21,000 | 22,000 |
| Kg./sq. cm. | 1600 | 1595 | 1570 | 1605 | 1475 | 1545 |
| Flexural modulus: |  |  |  |  |  |  |
| Psi. | 475,000 | 480,000 | 481,000 | 496,000 | 460,000 | 474,000 |
| Kg./sq. cm. | 33,395 | 33,745 | 33,815 | 34,870 | 32,340 | 33,325 |
| Apparent viscosity (poises) at shear rate of 400 recip. sec. (approx.) | 15,000 | — | — | — | 11,000 | 19,000 |

These results show that for the most part, the properties of copolyimides of this invention containing 10 mole percent of units of formula I are roughly equivalent to those of copolyimides containing 20 mole percent of units derived from pyromellitic dianhydride. The apparent viscosity values show that said copolyimide of this invention is substantially more moldable than the corresponding pyromellitic dianhydride-derived product.

The copolyimides of this invention may be used in the formation of films, molding compounds, coatings and the like, in such areas of application as automobile and aviation applications for decorative and protective purposes, high temperature electrical insulators and dielectric capacitors, coil and cable wrappings, containers and container linings, laminating structures for application as films to various heat resistant or other types of materials, and filled compositions where the fillers may be asbestos, mica, glass fiber or the like. Other uses include as binders for asbestos fibers, carbon fibers and other fibrous materials making brake linings, and for formulation of molding compositions using fillers such as asbestos, glass fibers, talc, quartz, wood flour, finely divided carbon and silica. Still other uses for polyimides are described in a large number of U.S. patents.

What is claimed is:

1. A polymer comprising structural units having the formulas

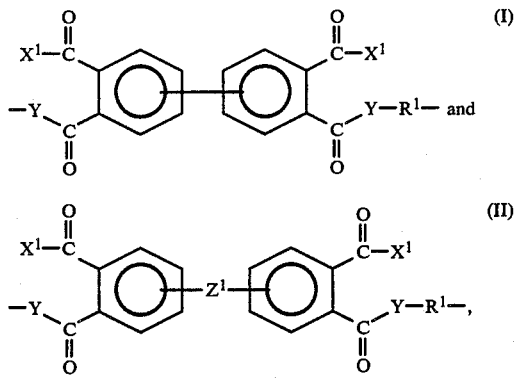

wherein:

$X^1$ is OH and Y is NH, or $X^1$ and Y taken together are N;

$R^1$ is an aromatic hydrocarbon radical containing about 6-20 carbon atoms, or a halogenated derivative thereof, an alkylene or cycloalkylene radical containing about 2-20 carbon atoms, or a bis-alkylene poly(dialkylsiloxane) radical;

$Z^1$ is $-R^2-$, $-O-$, $-CO-$, $-S_x-$, $-SO_2-$, $-O-Q-O-$, $-S-Q-S-$ or $-SO_2-Q-SO_2-$;

$R^2$ is a divalent aliphatic or alicyclic radical containing about 1-12 carbon atoms;

Q is a divalent aliphatic or aromatic radical; and x is 1 or 2;

said polymer containing about 2-50 mole percent of structural units having formula I.

2. A polymer according to claim 1 which is a copolyimide wherein $X^1$ and Y taken together are N.

3. A polymer according to claim 2 wherein the units of formula I are derived from 3,3',4,4'-tetracarboxybiphenyl.

4. A polymer according to claim 3 wherein $Z^1$ is —$R^2$—.

5. A polymer according to claim 4 wherein $R^2$ is —O—Q—O—.

6. A polymer according to claim 5 wherein Q has the formula

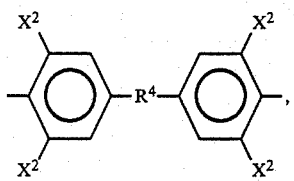
(V)

wherein $R^4$ is a straight chain or branched alkylene radical containing 1–5 carbon atoms and each $X^2$ is independently hydrogen or halogen.

7. A polymer according to claim 6 wherein $R^1$ is an aromatic hydrocarbon radical.

8. A polymer according to claim 7 wherein the units of formula I comprise about 5–25 mole percent thereof.

9. A polymer according to claim 8 wherein $R^4$ is isopropylidene and each $X^2$ is hydrogen.

10. A polymer according to claim 9 wherein the units of formula II are derived from the bis(3,4-dicarboxyphenoxy) compound.

11. A polymer according to claim 10 wherein $R^1$ is the m-phenylene or bis(4-phenylene)methane radical.

12. A polymer according to claim 11 wherein $R^1$ is m-phenylene.

13. A polymer according to claim 11 wherein $R^1$ is bis(4-phenylene)methane.

* * * * *